(12) United States Patent
Pimentel

(10) Patent No.: US 6,576,837 B1
(45) Date of Patent: Jun. 10, 2003

(54) OUTLET BOX COVER WITH MOUNTING CLIPS

(75) Inventor: Demetrio Pimentel, Atlanta, GA (US)

(73) Assignee: Belinda F. Peters, Atlanta, GA (US)

( * ) Notice: Subject to any disclaimer, the term of this patent is extended or adjusted under 35 U.S.C. 154(b) by 0 days.

(21) Appl. No.: 10/058,762

(22) Filed: Jan. 30, 2002

(51) Int. Cl.[7] .............................. H01H 9/02
(52) U.S. Cl. ................ 174/58; 174/60; 174/66; 220/241; 220/3.5; 33/528
(58) Field of Search ............... 174/58, 66, 67, 174/53, 55, 57, 60; 220/241, 242, 3.6, 3.8, 3.4, 3.9; 33/528; 248/906; 439/535

(56) References Cited

U.S. PATENT DOCUMENTS

| | | | |
|---|---|---|---|
| 1,400,824 A | 12/1921 | Knoderer | |
| 2,635,778 A | 4/1953 | Dieffenderfer et al. | 220/3.6 |
| 2,759,621 A | 8/1956 | Hamilton et al. | 220/3.6 |
| 2,788,187 A | 4/1957 | Cookson et al. | 248/27 |
| 2,815,144 A | 12/1957 | Kullander | 220/3.4 |
| 2,990,969 A | 7/1961 | Carson | 220/3.6 |
| 3,268,189 A | 8/1966 | Ducharme | 248/27 |
| 3,362,667 A | 1/1968 | Ginsburg | 248/27 |
| 3,424,332 A | 1/1969 | Pimentel | 220/3.6 |
| 3,424,333 A | 1/1969 | Pimentel | 220/3.6 |
| 3,590,137 A | 6/1971 | Librandi | 220/3.6 |
| 3,601,276 A | 8/1971 | Culpepper | 220/3.8 |
| 4,135,337 A | 1/1979 | Medlin | 52/221 |
| 4,399,922 A | 8/1983 | Horsley | 220/3.6 |
| 5,239,132 A | 8/1993 | Bartow | 174/58 |
| 5,828,002 A | * 10/1998 | Fedun | 174/58 |
| 5,931,325 A | * 8/1999 | Filipov | 174/57 |
| 5,965,844 A | * 10/1999 | Lippa | 174/58 X |
| 6,184,468 B1 | * 2/2001 | Speziale | 220/3.8 X |
| 6,323,424 B1 | * 11/2001 | He | 174/58 |

* cited by examiner

Primary Examiner—Anthony Dinkins
Assistant Examiner—Dhiru R. Patel
(74) Attorney, Agent, or Firm—Jacobson Holman PLLC

(57) ABSTRACT

A cover for an electrical outlet box which includes a plurality of bendable mounting clips constructed unitarily with the cover. In use, the mounting clips are oriented perpendicular to the outlet box cover and extend outwardly through an opening in a wall structure with the outer ends of the mounting clips then being bent outwardly into overlying engagement with the exterior of the wall surface in opposed relation to the outlet box cover thereby mounting the outlet box, and cover on the wall structure in alignment with the opening in the wall structure. The outlet box cover is mounted on the outlet box in a conventional manner and the mounting clips on the outlet box cover extend from the periphery of an opening in the cover for mounting electrical sockets, switches or the like in the outlet box in a conventional manner.

11 Claims, 3 Drawing Sheets

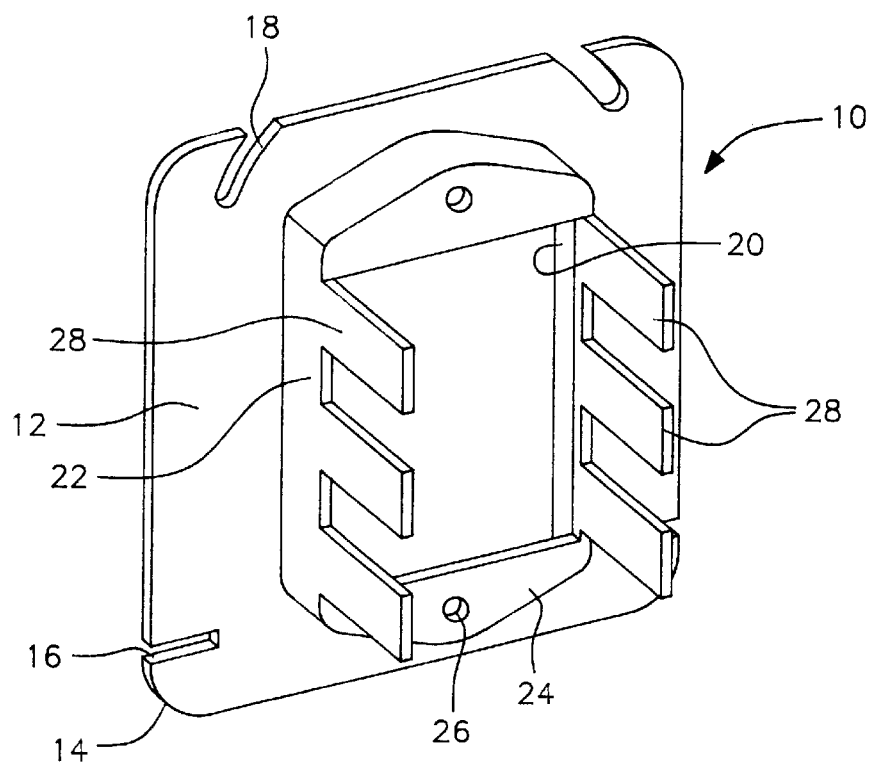
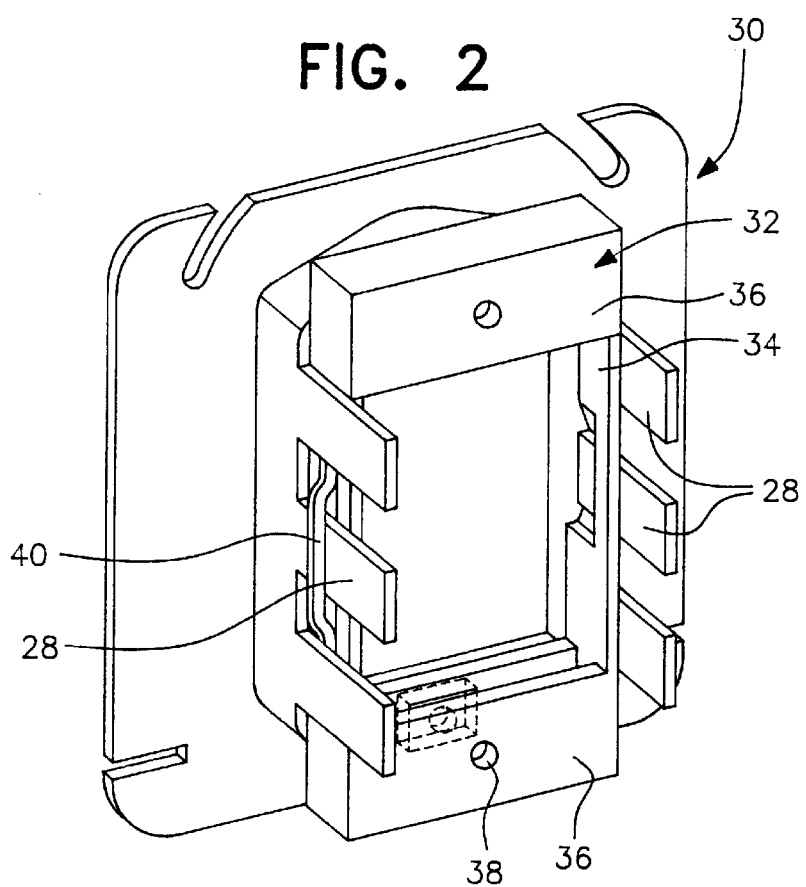

OUTLET BOX COVER WITH MOUNTING CLIPS

BACKGROUND OF THE INVENTION

1. Field of the Invention

The present invention generally relates to a cover for an electrical outlet box. More specifically, the present invention relates to the outlet box cover having a plurality of bendable mounting clips oriented perpendicularly to the outlet box cover and extending outwardly through an opening in a wall surface with the outer ends of the mounting clips then being bent outwardly into overlying engagement with the wall surface in opposed relation to the outlet box cover to thereby mount the outlet box and cover on a wall structure in alignment with the opening in the wall surface. The outlet box cover is mounted on the outlet box in a conventional manner and the mounting clips on the outlet box cover extend from the periphery of an opening in the cover for mounting electrical sockets, switches or the like in the outlet box in a conventional manner.

2. Description of the Prior Art

My prior U.S. Pat. Nos. 3,424,332 and 3,424,333, issued Jan. 28, 1969, disclose outlet box covers having mounting clips attached thereto which are associated with an opening in a wall structure to secure the outlet box and cover to the wall structure. The mounting clips in my above patents are separate components from an outlet box cover which enables them to be assembled with various types of outlet box covers. The necessity of assembling the mounting clips on the cover as disclosed in my above patents requires manual dexterity, consumes time and introduces the risk of dropping loose components into inaccessible areas in a wall structure. The prior art does not disclose a unitarily constructed outlet box cover and mounting clips to support the outlet box and cover from an opening in a wall surface so as to overcome the shortcomings of the prior art structures which have a plurality of components.

SUMMARY OF THE INVENTION

The outlet box cover with mounting clips of the present invention are of unitary construction with the mounting clips positioned along the interior periphery of an opening in the outlet box cover. The mounting clips are long enough to enable them to extend through an opening in a wall structure and then bent outwardly to engage an exterior surface of the wall structure to retain the cover and the outlet box attached to the cover in mounted position against the inner surface of the wall structure. The length of the mounting clips may vary for securing the outlet box cover and outlet box to wall structures having different thicknesses and the outlet box cover may have openings of different configurations such as cylindrical, rectangular or square depending upon the installation requirements.

An object of the present invention is to provide an outlet box cover for an electrical outlet box including a plurality of mounting clips which is of unitary construction thereby requiring the manipulation of only a single component rather than assembling a plurality of components which requires considerable manual dexterity end carries the risk of dropping small pieces, fasteners and the like, thus reducing the time required to install an outlet box and an outlet box cover in a wall structure.

Another object of the present invention is to provide an outlet box cover with the mounting clips integral with the peripheral edge of the opening in the outlet box cover in various embodiments; the mounting clips are spaced along the side edges of a rectangular plaster ring or collar in one embodiment, spaced along the side edges of a rectangular opening without a plaster ring or collar in another embodiment, thus enabling the cover and mounting clips to be installed in a thin wall panel such as a metal wall or thin panel of laminated material, and spaced circumferentially around a circular opening with cylindrical plaster ring or collar in a third embodiment.

Yet another object of this invention to be specifically enumerated herein is to provide an outlet box cover with integral mounting clips in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of an outlet box cover with mounting clips integral therewith in accordance with the present invention in which the mounting clips extend from the side edges of a generally rectangular plaster ring or collar.

FIG. 2 is a perspective view of the outlet box cover with mounting clips as illustrated in FIG. 1 combined with an extension when the outlet box and cover are mounted in a thick wall.

DESCRIPTION OF THE PREFERRED EMBODIMENTS

Figure 3:
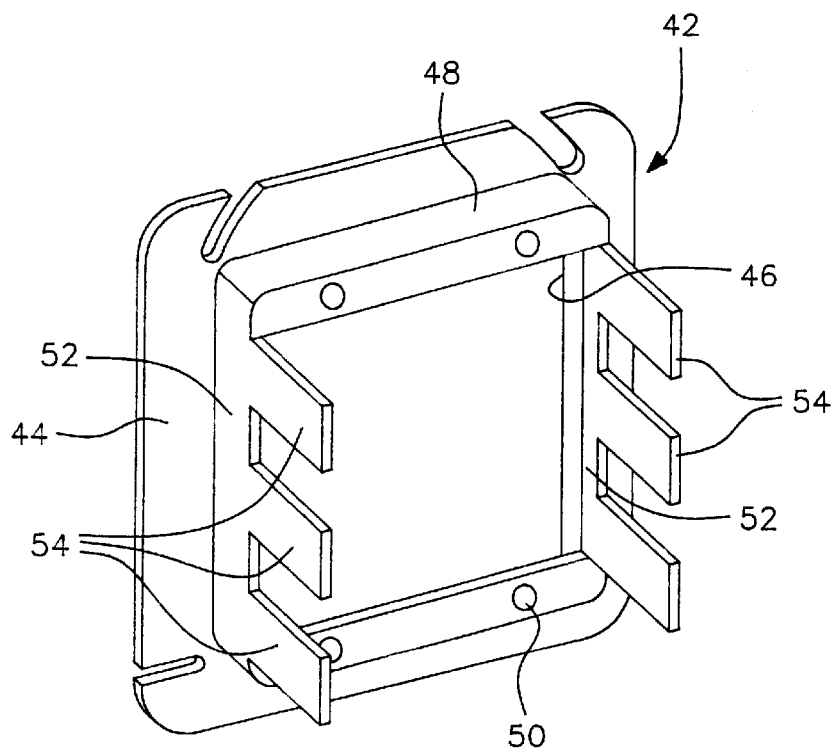
FIG. 3 is a perspective view of an outlet box cover with mounting clips integral with the plaster ring or collar in accordance with the present invention in which the cover receives dual switches or outlets.

Although multiple embodiments of the invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 6:
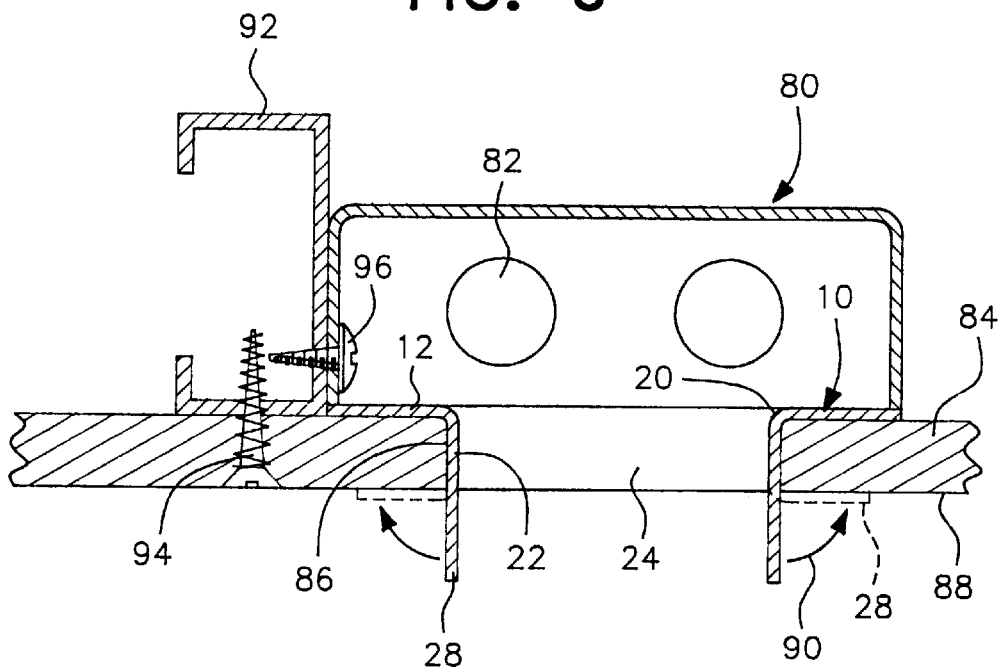
FIG. 6 is schematic sectional view illustrating the outlet cover of the present invention associated with an outlet box, wall opening and stud to which the outlet box may be attached.

The Outlet box cover illustrated in FIG. 1 is generally designated by reference numeral 10 and includes a substantially square panel 12 of metallic, rigid material, preferably galvanized steel. The panel 12 preferably includes rounded corners 14, inwardly extending notches 16 adjacent the lower outer edges and arcuate notches 18 in the upper edges. Screws (not shown) extend through diagonally opposed notches 16 and 18 into tabs on the interior perimeter of an outlet box 80, as shown in FIG. 6, in a manner well known in the art. The cover 12 is provided with a rectangular opening 20 defined by a perimeter wall 22 and top and bottom members 24 which define a plaster ring or collar. The plaster ring or collar is sized to fit into a wall opening and includes openings 26 in the top and bottom members 24 to which a switch or socket outlet body may be attached, preferably as by screws. The above described structure is conventional and well known with the depth of the collar or plaster ring enabling the socket or switch body to be oriented generally in alignment or projecting slightly outwardly from an inner surface of a wall structure.

The present invention is embodied by a plurality of projecting mounting clips 28 integral with the outer edges of walls 22 and constructed of the same material as the walls. The clips 28 have a length to enable them to be inserted through a wall opening in a manner described hereinafter and the free ends thereof bent outwardly to overlie and engage the exterior or outer surface of the wall structure. The mounting clips 28 are in the form of metal tabs of the same material as the cover 12 and collar defined by the walls 22 and the top and bottom members 24. Preferably, three tabs are provided on each side of the opening 20 and they can be manufactured with the mounting clips spaced equally apart and can initially be oriented in generally parallel relation to the cover panel 12 for transport and retail handling. For installation, the mounting clips 28 can then be bent into perpendicular relation to the panel 12 so that the outlet box and cover can be installed in a wall opening by extending the mounting clips through the wall opening. The free ends of clips 28 are then bent outwardly into overlying engagement with the exterior surface of the wall, peripherally of the opening in the wall, with the terminal ends of the mounting clips being located inwardly of the decorative cover plate through which a switch actuator or sockets extend.

FIG. 2 illustrates an embodiment of the invention generally designated by reference numeral 30 which is the same as that illustrated in FIG. 1 except that an extension, generally designated by reference numeral 32, is used against the outer surface of the top and bottom members 24 of the collar defined by the wall segment 22 and the wall members 24. The extension 32 is of rectangular construction and is provided with parallel side walls 34 interconnected by top and bottom members 36, which define a rectangular opening 37 therein aligned with the opening 20 in the cover 10. The top and bottom members 36 have an aperture 38 aligned with apertures 26 for mounting a switch or socket assembly in position. Each side wall 34 is provided with an outwardly struck offset portion 40 which receives central mounting clip 28 on each side wall 22 to retain the extension 32 on the cover 30. The mounting clips 28 are the same as the mounting clips 28 in FIG. 1 and function in the same manner. The mounting clips 28 may be longer since this embodiment of the invention is for use in a thicker wall structure.

FIG. 3 illustrates an embodiment of the invention for use with multiple switches or multiple sockets and is generally designated by reference numeral 42. This embodiment includes a square plate 44 which is similar to that illustrated in FIGS. 1 and 2 except that the plate 44 is square and provided with an opening 46 which is also square. Opening 46 includes a collar 48 peripherally thereof. The collar 48 includes multiple openings 50 to receive mounting screws for multiple switch bodies, outlet bodies or, in some instances, a switch body and an outlet body. Each side wall 52 of the collar 48 is provided with projecting mounting clips 54 which are unitary with wall 52 and the same as those illustrated in FIGS. 1 or 2 and which function in the same manner.

Figure 4:
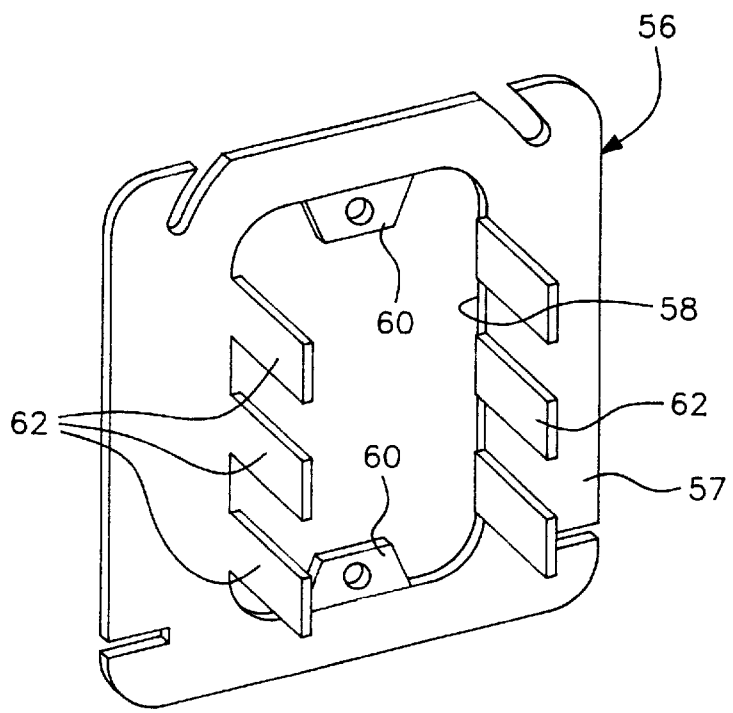
FIG. 4 is a perspective view of a cover in accordance with the present invention with short mounting clips extending from a rectangular opening without any plaster ring or collar in order to mount the outlet box and cover on a metal wall or other thin wall material.

FIG. 4 illustrates another outlet cover in accordance with the present invention generally designated by reference numeral 56. The cover 56 also involves a square plate 57 with a rectangular opening 58 having inwardly extending tabs 60 along the top and bottom edges thereof. The cover 56 does not include any collar or plaster ring since this embodiment of the invention is for mounting on a thin wall panel such as sheet metal, plywood, laminated material or the like. Each side edge of the opening 58 is provided with mounting clips 62 extending perpendicular to plate 57. The clips 62 are shorter than the mounting clips illustrated in FIGS. 1–3 for extending through an opening in a thin wall structure. The free ends of the clips 62 are also bent outwardly into overlying engagement with the outer surface of a thin wall structure in the same manner as the embodiments illustrated in FIGS. 1–3.

Figure 5:
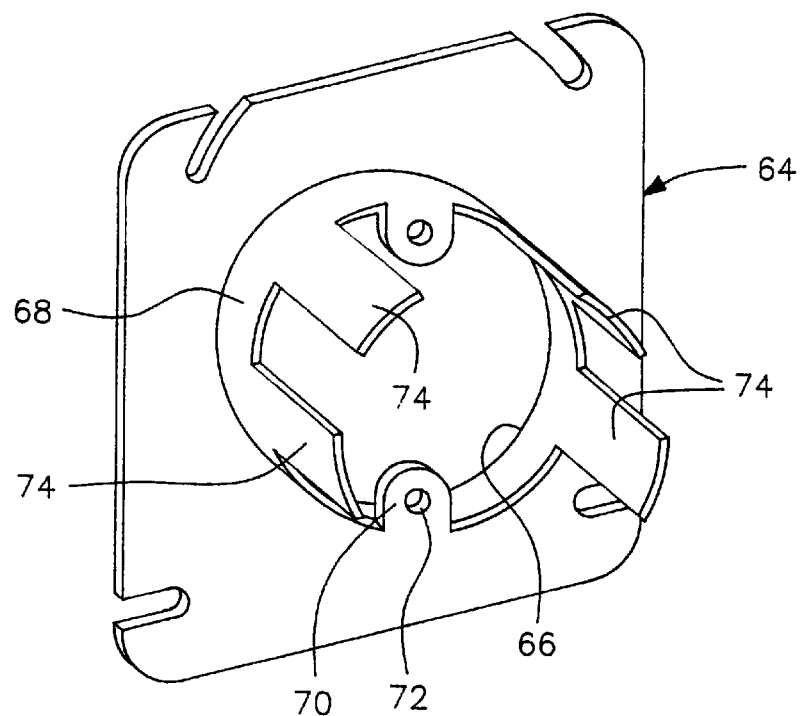
FIG. 5 is a perspective of an outlet box cover in accordance with the present invention having a cylindrical plaster ring or collar and opening with the mounting clips on the peripheral edge of the plaster ring or collar.

FIG. 5 illustrates an outlet box cover 64 of the same construction as those in FIGS. 1–4 except that this embodiment of the invention includes a circular opening 66 defined by a peripheral collar or plaster ring 68 of cylindrical configuration. The top and bottom portions of the cylindrical collar 68 include inwardly extending tabs 70 having an opening 72 to enable a switch or socket body to be mounted thereon. The edge of the cylindrical collar 68 is also provided with a plurality of bendable mounting clips 74 which are spaced peripherally of the edge of the cylindrical collar 68 and extend through a circular opening in a wall structure with the free ends of the mounting clips bendable outwardly into overlying engagement with the outer surface of the wall structure in a manner similar to that illustrated in FIGS. 1–4.

FIG. 6 illustrates schematically the installation of an outlet box, generally designated by reference numeral 80, having knockout openings 82 mounted against a wall structure 84 having an opening 86 formed therein. An outlet box cover such as the cover 10 illustrated in FIG. 1 is mounted to close the open end of the outlet box 80 in a conventional manner. The collar formed by the walls 22 and 24 extends through the opening 86 of the wall structure 84. The mounting clips 28 project outwardly beyond the exterior surface 88 of the wall structure 84. The mounting clips 28 are bent outwardly in the direction indicated by arrows 90 in FIG. 6 to overlie and engage the outer surface 88 of the wall structure 84 in opposed relation to the external surface of the cover plate 12. FIG. 6 illustrates a wall stud 92 supporting the wall structure 84 with the wall structure 84 being secured to the stud 92 by a conventional fastening screw 94 or the like. Also, the outlet box may be attached to the stud 92 by fasteners 96 in a conventional manner of installation. When using the present invention, the location of the outlet box adjacent the stud is optional since the mounting clips adequately support the outlet box and cover as well as the switch bodies, outlet bodies and electrical conductors from the wall structure in areas spaced from wall studs or other supports.

Inasmuch as each embodiment of the invention includes integral mounting clips, the installation procedure is substantially simplified since there is only a single component to manipulate and it is only necessary to buy a single part including the cover plate and mounting clips. By eliminating the assembly of multiple parts, the risks of dropping or losing smaller parts is eliminated thereby enabling more efficient use of time in installing electrical circuits. Since the present invention enables installation of outlet boxes next to or spaced from a stud, joist or the like greater flexibility of installation is also obtained. In addition, the cover with mounting clips of the present invention can be used with wall structures including thin wall coverings such as metal, plywood paneling, laminate material or the like. Further, the outlet box cover and mounting clips of the present invention preclude the decorative cover plate, frequently being constructed of plastic, from supporting the outlet box which can cause breakage of the decorative plate. The larger surface areas which engage the wall surfaces provide greater stability in plaster walls or gypsum board walls. The mounting clips can be restraightened after use to enable them to be reusable by using conventional hand tools to straighten the clips back to a straight position for insertion through an opening in the wall structure.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An outlet box cover comprising a substantially flat, rigid cover plate attached to and forming a closure for an open end of an outlet box, said plate including a centrally disposed opening for alignment with an opening in a wall surface to provide access to an interior of an outlet box connected to said plate, a plurality of bendable mounting clips extending from and unitary with the periphery of said opening in said plate, said mounting clips extending through an opening in a wall surface and being bendable to enable free ends thereof to be bent outwardly into overlying engagement with a wall surface peripherally of the opening in the wall surface.

2. The cover plate as defined in claim 1, wherein said opening is defined by a peripheral collar extending from the cover plate in opposed relation to an outlet box on which the cover plate is mounted, said bendable mounting clips being integral with said collar and said cover plate.

3. The cover plate as defined in claim 1, wherein said opening is circular and defined by a cylindrical collar, said mounting clips being integral with and extending from an edge of said collar spaced from the mounting plate.

4. The cover plate as defined in claim 2, wherein an annular extension member is mounted on said mounting clips and against said collar for extending through a wall opening in a thick wall structure.

5. A cover for an electrical junction box positioned interiorly of a wall panel having an opening therethrough, said cover being secured to and forming a closure for an open end of said junction box, said cover including a plurality of mounting clips unitary with the cover and projecting therefrom, said mounting clips extending through said opening in the wall panel to a position outwardly of the exterior of said wall panel, said clips including end portions bent outwardly into engagement with the exterior surface of the wall panel peripherally of the opening to secure the cover and junction box to said wall panel.

6. The cover as defined in claim 5, wherein said cover includes an opening to provide access to the interior of said junction box, said mounting clips being unitary with the peripheral edge of the opening in the cover and extending through the opening in the wall panel adjacent the peripheral edge of the opening in the wall panel to preclude lateral movement of the junction box and cover in relation to the wall panel.

7. The cover as defined in claim 6, wherein said opening in the cover and the opening in the wall panel are rectangular.

8. The cover as defined in claim 6, wherein said opening in the cover is circular and includes a cylindrical projection to which said mounting clips are connected.

9. The cover as defined in claim 5, wherein said cover includes an opening defined by a peripheral collar extending from the cover and into the opening in said wall panel, said mounting clips extending from and being unitary with said collar and extending from a free edge of said collar, a free end portion of said mounting clips being bendable outwardly into engagement with the exterior of the wall panel to secure the cover and junction box to said wall panel.

10. The cover as defined in claim 9 including an annular extension member mounted on said mounting clips and positioned against said collar for extending into an opening in a thick wall panel.

11. The cover as defined in claim 9, wherein said collar extends continuously around the peripheral edge of said opening.

* * * * *